United States Patent
Yoshida et al.

(10) Patent No.: US 9,758,853 B2
(45) Date of Patent: Sep. 12, 2017

(54) HOT-DIP AL—ZN ALLOY COATED STEEL SHEET AND METHOD FOR PRODUCING SAME

(71) Applicant: JFE STEEL CORPORATION, Chiyoda-ku, Tokyo (JP)

(72) Inventors: Masahiro Yoshida, Fukuyama (JP); Akira Matsuzaki, Fukuyama (JP); Satoru Ando, Fukuyama (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 14/763,913

(22) PCT Filed: Feb. 17, 2014

(86) PCT No.: PCT/JP2014/000801
§ 371 (c)(1),
(2) Date: Jul. 28, 2015

(87) PCT Pub. No.: WO2014/155944
PCT Pub. Date: Oct. 2, 2014

(65) Prior Publication Data
US 2015/0361538 A1  Dec. 17, 2015

(30) Foreign Application Priority Data
Mar. 28, 2013  (JP) ................. 2013-069788

(51) Int. Cl.
| | | |
|---|---|---|
| *C23C 2/12* | (2006.01) | |
| *C23C 2/28* | (2006.01) | |
| *C23C 2/06* | (2006.01) | |
| *C23C 2/40* | (2006.01) | |
| *C22C 18/04* | (2006.01) | |
| *C22C 21/00* | (2006.01) | |
| *B32B 15/01* | (2006.01) | |
| *C23C 2/04* | (2006.01) | |
| *C23C 2/00* | (2006.01) | |
| *C23C 2/26* | (2006.01) | |
| *C23C 30/00* | (2006.01) | |
| *C22C 21/10* | (2006.01) | |

(52) U.S. Cl.
CPC .............. *C23C 2/12* (2013.01); *B32B 15/012* (2013.01); *B32B 15/013* (2013.01); *C22C 18/04* (2013.01); *C22C 21/00* (2013.01); *C22C 21/10* (2013.01); *C23C 2/00* (2013.01); *C23C 2/04* (2013.01); *C23C 2/06* (2013.01); *C23C 2/26* (2013.01); *C23C 2/28* (2013.01); *C23C 2/285* (2013.01); *C23C 2/40* (2013.01); *C23C 2/405* (2013.01); *C23C 30/00* (2013.01); *C23C 30/005* (2013.01); *Y10T 428/12757* (2015.01); *Y10T 428/12799* (2015.01); *Y10T 428/12972* (2015.01); *Y10T 428/12979* (2015.01); *Y10T 428/12993* (2015.01)

(58) Field of Classification Search
CPC .. C23C 2/12; C23C 2/26; C23C 2/405; C23C 2/06; C23C 2/40; C23C 2/28; C23C 2/04; C23C 2/00; C23C 2/285; C23C 30/00; C23C 30/005; C22C 18/04; C22C 18/00; C22C 21/10; C22C 21/00; C22C 30/00; C22C 30/06; B32B 15/013; B32B 15/012; B32B 15/04; B32B 15/043; B32B 15/18; B32B 15/20; Y10T 428/12799; Y10T 428/12757; Y10T 428/12972; Y10T 428/12979; Y10T 428/12993
See application file for complete search history.

(56) References Cited

U.S. PATENT DOCUMENTS

| | | | |
|---|---|---|---|
| 4,287,008 A | 9/1981 | Torok et al. | |
| 6,635,359 B1 * | 10/2003 | Kurosaki | ................ C23C 2/06 428/648 |
| 2009/0139872 A1 | 6/2009 | Weiher et al. | |
| 2009/0269611 A1 | 10/2009 | Liu et al. | |
| 2013/0089672 A1 | 4/2013 | Fujii | |

FOREIGN PATENT DOCUMENTS

| | | |
|---|---|---|
| CN | 1072732 A | 6/1993 |
| CN | 1342211 A | 3/2002 |
| CN | 101253280 A | 8/2008 |
| CN | 102181811 A | 9/2011 |
| CN | 102268625 A | 12/2011 |
| EP | 0028821 A1 | 5/1981 |
| EP | 0276457 A2 | 8/1988 |
| EP | 0545049 A1 | 6/1993 |
| EP | 1199376 A1 | 4/2002 |
| JP | S5687654 A | 7/1981 |
| JP | S61-028748 B2 | 7/1986 |
| JP | 2001-316791 A | 11/2001 |
| JP | 2002-012959 A | 1/2002 |

(Continued)

OTHER PUBLICATIONS

Machine Translation, Maki et al., JP 2001-316791, Nov. 2001.*
Machine Translation, Li et al., CN 102268625, Dec. 2007.*
Jan. 15, 2016, Office Action issued by IP Australia in the corresponding Australian Patent Application No. 2014240655.
May 13, 2014 International Search Report issued in International Patent Application No. PCT/JP2014/000801.
Aug. 4, 2015, Office Action issued by the Japan Patent Office in the corresponding Japanese Patent Application No. 2014-527419.
Mar. 11, 2016, European Search Report issued by the European Patent Office in the corresponding European Patent Application No. 14775425.3.

(Continued)

Primary Examiner — Michael E La Villa
(74) Attorney, Agent, or Firm — Kenja IP Law PC (57) ABSTRACT

Disclosed is a hot-dip Al—Zn alloy coated steel sheet having excellent anti-corrosion property after coating, and a method for producing the same. In the disclosure, the hot-dip Al—Zn alloy coated steel sheet has a hot-dip coating layer containing by mass %, Al: 25% to 90%, and at least one of Sn: 0.01% to 2.0%, In: 0.01% to 10%, and Bi: 0.01% to 2.0%.

14 Claims, 2 Drawing Sheets

(56) References Cited

FOREIGN PATENT DOCUMENTS

| KR | 1019830004426 A | 7/1983 |
|---|---|---|
| KR | 1020020040771 A | 5/2002 |
| WO | 01/11100 A1 | 2/2001 |
| WO | 2007/108496 A1 | 9/2007 |

OTHER PUBLICATIONS

Mar. 22, 2016, Office Action issued by the Japan Patent Office in the corresponding Japanese Patent Application No. 2014-527419 with English language statement of relevance.
Jul. 20, 2016 Office Action issued by the Korean Intellectual Property Office in the corresponding Korean Patent Application No. 10-2015-7024573 with English language statement of relevance.
Aug. 30, 2016, Office Action issued by the State Intellectual Property Office in the corresponding Chinese Patent Application No. 201480016958.8 with English language Search Report.
Dec. 6, 2016, Office Action issued by the Korean Intellectual Property Office in the corresponding Korean Patent Application No. 10-2015-7024573, with English language Concise Statement of Relevance.
Mar. 2, 2017, Office Action issued by the State Intellectual Property Office in the corresponding Chinese Patent Application No. 201480016958.8 with English language Search Report.

\* cited by examiner

HOT-DIP AL—ZN ALLOY COATED STEEL SHEET AND METHOD FOR PRODUCING SAME

TECHNICAL FIELD

This disclosure relates to a hot-dip Al—Zn alloy coated steel sheet having excellent anti-corrosion property after coating, and a method for producing the same.

BACKGROUND

A hot-dip Al—Zn alloy coated steel sheet such as a hot-dip Al—Zn alloy coated steel sheet containing 25 mass % to 90 mass % of Al in the zinc or zinc alloy coating layer show better anti-corrosion property than a hot-dip galvanized steel sheet.

Generally, the hot-dip Al—Zn alloy coated steel sheet is produced using as the base steel sheet, a thin steel sheet obtained by hot rolling or cold rolling a steel slab, and subjecting said base steel sheet to recrystallization annealing and hot-dip coating treatment in an annealing furnace of a continuous galvanizing line (CGL). The hot-dip Al—Zn alloy coating layer formed comprises an alloy layer existing in the interface with the base steel sheet, and an upper layer existing thereon. Further, the upper layer is mainly composed of a part where Zn is contained in a supersaturated state and Al is solidified by dendrite solidification ($\alpha$-Al phase), and a remaining interdendritic part (Zn rich phase), and the part where Al is solidified by dendrite solidification is laminated in the thickness direction of the hot-dip coating layer. Due to the characteristic coating structure of the upper layer, the course of corrosion development from surfaces becomes complicated, and corrosion less likely reaches the base steel sheet. As a result, the hot-dip Al—Zn alloy coated steel sheet has better anti-corrosion property than a hot-dip galvanized steel sheet with a hot-dip coating layer with the same thickness.

The molten bath contains incidental impurity, and Fe leaching for example from steel sheets or equipment in the molten bath, and in addition, Si for inhibiting excessive growth of the alloy layer, is normally added. Si exists in the alloy layer, in the form of an intermetallic compound, or in the upper layer in the form of an intermetallic compound, solid solution, or a simple substance. Si provides an effect of inhibiting growth of the alloy layer of the interface of the base steel sheet of the hot-dip Al—Zn alloy coated steel sheet, and the thickness of the alloy layer is around 1 $\mu$m to 5 $\mu$m. If the thickness of the hot-dip coating layer is the same, the thinner the alloy layer is, the upper layer which provides an effect of improving anti-corrosion property is thicker, and therefore, limiting growth of the alloy layer contributes to the improvement of anti-corrosion property. Further, the alloy layer is harder than the upper layer and acts as the origin of cracks during processing. Therefore, limiting the growth of the alloy layer would reduce generation of cracks and provide an effect of improving bending workability. Further, in the generated cracks, the base steel sheet is exposed and anti-corrosion property is poor. Therefore, inhibiting growth of the alloy layer and inhibiting generation of cracks would improve the anti-corrosion property in parts subjected to bending.

Because of their excellent anti-corrosion property, a demand for hot-dip Al—Zn alloy coated steel sheets is increasing mainly in the field of building materials such as roofs, walls which are exposed to outdoor environments for a long period of time. Further, hot-dip Al—Zn alloy coated steel sheets are recently being used also in the field of automobiles. Particularly in the field of automobiles, there is a demand, as one of the countermeasures for global warming, to reduce the weight of the vehicle body to improve fuel efficiency and reduce $CO_2$ emission. For this reason, there is a strong demand for weight reduction by using high strength steel sheets, and gauge reduction by improving anti-corrosion property of steel sheets. However, when using hot-dip Al—Zn alloy coated steel sheets in the field of automobiles, particularly for outer panels, the following problems arise.

Generally, when using hot-dip Al—Zn alloy coated steel sheets as automobile outer panels, the hot-dip coated steel sheets are delivered to automobile manufacturers or the like in a state where hot-dip coating has already been applied on the steel sheets in a continuous galvanizing line, then worked into shapes of panel components, then subjected to chemical conversion treatment, and then three-coat refinishing for automobiles consisting of electrodeposition coating, intercoating, and topcoating. However, with outer panels using hot-dip Al—Zn alloy coated steel sheets, when the coating film is damaged, the hot-dip coating layer with a characteristic phase structure, consisting of two phases i.e. the above described $\alpha$-Al phase and the Zn rich phase causes preferential dissolution of Zn (selective corrosion of the Zn rich phase) in the interface between the coating film and the hot-dip coating, with the damaged part acting as the origin. This progresses deep into the sound part of the coating film and causes a large coating film blister. As a result, there were cases where sufficient anti-corrosion property (anti-corrosion property after coating) could not be secured for outer panels using hot-dip Al—Zn alloy coated steel sheets.

On the other hand, anti-corrosion property after coating is also a problem when using hot-dip Al—Zn alloy coated steel sheets in the field of building materials as roof material or wall material for buildings. When used as roof materials or wall materials, hot-dip coated steel sheets are normally delivered to construction companies or the like in a state where undercoating and topcoating have already been applied on the steel sheets, and are then sheared into a desired size before use. Therefore, the edge surfaces of the steel sheets without a coating film inevitably becomes exposed, and with these part acting as the origin, coating film blisters referred to as edge creeps may be caused. When using hot-dip Al—Zn alloy coated steel sheets in the field of building materials, similarly to the case for using them as the automobile outer panels, selective corrosion of the Zn rich phase occurs in the interface between the coating film and the hot-dip coating, with the edge surfaces of the steel sheets acting as the origin. As a result, when using hot-dip Al—Zn alloy coated steel sheets in the field of building materials, edge creeps significantly larger than when using hot-dip Zn alloy coating would be generated and the anti-corrosion property after coating would be inferior.

In order to solve the above problems, for example, PTL 1 (JP2002012959A) discloses a hot-dip Al—Zn alloy coated steel sheet obtained by adding Mg, and further Sn or the like to the coating composition, to form Mg compounds such as $Mg_2Si$, $MgZn_2$, $Mg_2Sn$ in the hot-dip coating layer to inhibit generation of red rust from the edge surfaces of the steel sheet.

However, when applying a coating film on the hot-dip Al—Zn alloy coated steel sheet disclosed in PTL 1, the problem relating to the anti-corrosion property of when the coating film is later damaged (anti-corrosion property after coating) could not be resolved.

Further, there are cases where hot-dip Al—Zn alloy coated steel sheets are used in the field of building materials or consumer electronics without applying a coating film thereon. Particularly when used as wall materials, back plates of consumer electronics and the like, the surface of the coated steel sheet is exposed to be seen and therefore good appearance quality is required. Appearance quality is determined mainly by the presence of defects such as adhesion of foreign matters, bare spots, flaws as well as variation in patterns and colors. Patterns and colors are qualities strongly required when hot-dip Al—Zn alloy coated steel sheets are used without coating. Therefore, not all hot-dip Al—Zn alloy coated steel sheets used as film coated steel sheets are applicable to applications where the hot-dip Al—Zn alloy coated steel sheets are used without a coating film (wall materials, back plates of consumer electronics and the like), and there was also a demand for further improvement in appearance quality.

Further, with hot-dip Al—Zn alloy coated steel sheets, there were cases where the hot-dip coated surface would gradually turn into a black color (blackening), depending on the composition of the hot-dip coating. For example, even with the hot-dip Al—Zn alloy coated steel sheets containing Sn disclosed in PTL 1, there are cases where blackening occurs. As described above, not all hot-dip Al—Zn alloy coated steel sheets could be used in applications where the sheets are used without a coating film.

CITATION LIST

Patent Literature

PTL 1: JP2002012959A

It could thus be helpful to provide a hot-dip Al—Zn alloy coated steel sheet having excellent anti-corrosion property after coating, and a method for producing the same.

SUMMARY

In order to solve the above problems, we have made intensive studies. As a result, we discovered that by containing Al, and one of Sn, In, and Bi in the hot-dip coating layer, excellent anti-corrosion property after coating which was conventionally unavailable, can be obtained.

Further, we discovered that, by optionally setting the Vickers hardness of the hot-dip coating layer to a particular range, the hot-dip coating layer can be softened to obtain good workability and improve anti-corrosion property in worked parts.

This disclosure has been made based on these discoveries and primary features thereof are as described below.

[1] A hot-dip Al—Zn alloy coated steel sheet having a hot-dip coating layer, wherein the hot-dip coating layer contains by mass %, Al: 25% to 90%, and at least one element selected from a group consisting of Sn: 0.01% to 2.0%, In: 0.01% to 10%, and Bi: 0.01% to 2.0%.

[2] The hot-dip Al—Zn alloy coated steel sheet according to aspect [1], wherein the hot-dip coating layer further contains by mass %, Zn: 10% or more.

[3] The hot-dip Al—Zn alloy coated steel sheet according to aspect [1] or [2], wherein the hot-dip coating layer further contains by mass %, Si: 0.1% to 10%.

[4] The hot-dip Al—Zn alloy coated steel sheet according to any one of aspects [1] to [3], wherein the hot-dip coating layer contains by mass %, Al: 45% to 70%.

[5] The hot-dip Al—Zn alloy coated steel sheet according to any one of aspects [1] to [4], wherein the hot-dip coating layer contains at least one element selected from a group consisting of Sn: 0.01 mass % to 1.0 mass %, In: 0.01 mass % to 1.0 mass %, and Bi: 0.01 mass % to 1.0 mass %.

[6] The hot-dip Al—Zn alloy coated steel sheet according to any one of aspects [1] to [5], wherein the mean Vickers hardness of the hot-dip coating layer is 50 Hv to 100 Hv.

[7] A method for producing a hot-dip Al—Zn alloy coated steel sheet in a continuous galvanizing line, the method comprising: immersing a base steel sheet in a molten bath to apply hot-dip coating thereon, the molten bath containing by mass %, Al: 25% to 90%; at least one element selected from a group consisting of Sn: 0.01% to 2.0%, In: 0.01% to 10%, and Bi: 0.01% to 2.0%; and the balance including Zn and incidental impurities.

[8] The method for producing a hot-dip Al—Zn alloy coated steel sheet according to aspect [7], wherein the molten bath contains by mass %, Zn: 10% or more.

[9] The method for producing a hot-dip Al—Zn alloy coated steel sheet according to aspect [7] or [8], wherein the molten bath contains by mass %, Si: 0.1% to 10%.

[10] The method for producing a hot-dip Al—Zn alloy coated steel sheet according to any one of aspects [7] to [9], wherein the molten bath contains by mass %, at least one element selected from a group consisting of Sn: 0.01% to 1.0%, In: 0.01% to 1.0%, and Bi: 0.01% to 1.0%.

[11] The method for producing a hot-dip Al—Zn alloy coated steel sheet according to any one of aspects [7] to [10], further comprising holding the hot-dip coated steel sheet at a temperature of 250° C. to 375° C. for 5 seconds to 60 seconds.

[12] The method for producing a hot-dip Al—Zn alloy coated steel sheet according to aspect [11], wherein the hot-dip coated steel sheet is held at a temperature of 300° C. to 375° C. for 5 seconds to 60 seconds.

With this disclosure, a hot-dip Al—Zn alloy coated steel sheet having excellent anti-corrosion property, in particular, anti-corrosion property after coating, can be obtained. Further, by making the hot-dip Al—Zn alloy coated steel sheet of the disclosure a high strength steel sheet, both weight reduction and excellent anti-corrosion property can be achieved in the field of automobiles. Further, by using such hot-dip Al—Zn alloy coated steel sheets in the field of building materials as roof materials or wall materials, it would be possible to lengthen the life of buildings.

BRIEF DESCRIPTION OF THE DRAWING

In the accompanying drawing.

DETAILED DESCRIPTION

The following describes our method and product in detail. In addition, although the unit of content of each element indicating the chemical compositions of the hot-dip coating layer and the molten bath are "mass %", it will be simply expressed by "%" unless otherwise specified.

First, the method for improving anti-corrosion property after coating of the hot-dip Al—Zn alloy coated steel sheet, which is most important, will be explained.

The hot-dip Al—Zn alloy coated steel sheet of the disclosure contains, in the hot-dip coating layer, Al and at least one element selected from a group consisting of Sn: 0.01% to 2.0%, In: 0.01% to 10%, and Bi: 0.01% to 2.0%. By containing at least one of Sn, In, and Bi in the hot-dip coating layer, it is possible to improve anti-corrosion property after coating.

When the hot-dip coating layer of a conventional hot-dip Al—Zn alloy coated steel sheet which does not include these elements is exposed to the air, a dense and stable oxide film of $Al_2O_3$ is immediately formed around the α-Al phase, and due to the protection function provided by the oxide film, the solubility of the α-Al phase becomes significantly lower than the solubility of the Zn rich phase. As a result, with a film coated steel sheet using a conventional Al—Zn alloy coated steel sheet as the base steel, when the coating film is damaged, the damaged part becomes the origin and selective corrosion of the Zn rich phase occurs in the interface between the coating film and the hot-dip coating, and the corrosion progresses deep into the sound part of the coating film and causes a large coating film blister. This results in poor anti-corrosion property after coating. On the other hand, with a film coated steel sheet using a hot-dip Al—Zn alloy coated steel sheet containing one of Sn, In, and Bi as the base steel, Sn, In, and Bi each break the aforementioned Al oxide film formed around the α-Al phase and increases the solubility of the α-Al phase, and causes uniform corrosion of the hot-dip coating layer where the α-Al phase and the Zn rich phase both dissolve. Therefore, selective corrosion of the Zn rich phase which is a problem with a film coated steel sheet using a conventional Al—Zn alloy coated steel sheet as the base steel, can be inhibited. As a result, a hot-dip Al—Zn alloy coated steel sheet containing at least one of Sn, In, and Bi in the hot-dip coating layer shows excellent anti-corrosion property after coating.

Next, the composition of the hot-dip coating layer of the hot-dip Al—Zn alloy coated steel sheet described herein will be described.

The content of Sn, In, and Bi in the hot-dip coating layer are each set to be Sn: 0.01% to 2.0%, In: 0.01% to 10%, Bi: 0.01% to 2.0%, for the following reasons. If the content of each of Sn, Bi, In is less than 0.01%, the breakage of Al oxide film which enables inhibiting the above described selective corrosion of Zn rich phase does not occur, and therefore it is unlikely to achieve improvement in anti-corrosion property after coating. Conversely, if the content of Sn and Bi each exceed 2.0% or the content of In exceeds 10%, breakage of the Al oxide film occurs severely, and solubility of the whole hot-dip coating layer increases excessively. As a result, even if the hot-dip coating layer is uniformly corroded, the dissolving rate increases and causes a large blister in the coating film, and anti-corrosion property after coating deteriorates. Therefore, in order to stably obtain excellent anti-corrosion property after coating, it is necessary to contain each of Sn, In, Bi in the ranges of Sn: 0.01% to 2.0%, In: 0.01% to 10%, Bi: 0.01% to 2.0%.

By adding to the hot-dip coating layer, two or more elements selected from a group consisting of Sn, In, and Bi in combination, it is possible to obtain the same effect as when one of the elements is contained. However, from the viewpoint of actual operation, in order to stably and simply manage the composition of the molten bath, it is preferable to reduce the number of elements to contain, specifically, to contain one of Sn, In, Bi alone.

Further, by limiting the content of each of Sn, In, and Bi in the hot-dip coating layer to 0.10% or less, it is possible to inhibit blackening of the hot-dip coating surface, and achieve a particularly excellent appearance quality.

Further, by limiting each content to 1.0% or less, appearance of the surface will not be a problem even when using the hot-dip Al—Zn alloy coated steel sheet without applying a coating film. For these reasons, in order to achieve both anti-corrosion property after coating and coating appearance, the content of each of Sn, In, and Bi in the hot-dip coating layer is preferably in a range of 0.01% to 1.0%, and more preferably in a range of 0.01% to 0.10%.

The hot-dip Al—Zn alloy coated steel sheet of the disclosure is a hot-dip Al—Zn alloy coated steel sheet containing 25% to 90% of Al in the hot-dip coating layer. Further, from the viewpoint of balancing the anti-corrosion property with actual operation requirements, the Al content in the hot-dip coating layer is preferably in the range of 45% to 70%, and more preferably in the range of 50% to 60%. If the Al content in the hot-dip coating layer is 25% or more, the above mentioned dendrite solidification of Al occurs in the upper layer existing in the alloy layer existing in the interface with the base steel sheet. Thus, the upper layer is mainly composed of a part where Zn is contained in a supersaturated state and Al is solidified by dendrite solidification, and a remaining interdendritic part, and the part where Al is solidified by dendrite solidification is laminated in the thickness direction of the hot-dip coating layer and has a structure with excellent anti-corrosion property. To stably obtain a hot-dip coating layer with such phase structure, the Al content is preferably 45% or more. On the other hand, if the Al content exceeds 90%, the content of Zn which has sacrificial corrosion protection ability against Fe decreases, and anti-corrosion property deteriorates when the steel base is exposed. In general, the smaller the amount of coating weight is, the more likely the steel base becomes exposed. Therefore, in order to obtain sufficient anti-corrosion property with a small coating weight, Al content is preferably 70% or less. Further, when performing hot-dip coating of Al—Zn alloy, the molten bath temperature (hereinafter referred to as the bath temperature) rises as the Al content increases, and therefore problems regarding actual operation may be caused. However, with the above Al content, the bath temperature would be appropriate and would not cause any problems.

The base steel sheet used for the hot-dip Al—Zn alloy coated steel sheet of the disclosure is not limited to a particular type. For example, a hot rolled steel sheet or steel strip subjected to acid pickling descaling, or a cold rolled steel sheet or steel strip obtained by cold rolling them may be used.

For the hot-dip coated steel sheet of the disclosure, Zn content of the hot-dip coating layer is preferably 10% or more, more preferably 10% to 75%, even more preferably 30% to 55%, and particularly preferably 40% to 50%.

With Zn content of 10% or more, the hot-dip coating exhibits sufficient sacrificial corrosion protection ability against Fe, and therefore anti-corrosion property is sufficient when the steel base is exposed. On the other hand, by limiting the Zn content to 75% or less, excessive sacrificial corrosion protection ability is prevented, and deterioration of anti-corrosion property caused by facilitation of dissolution of the hot-dip coating layer is prevented.

For the hot-dip coated steel sheet of the disclosure, Si content of the hot-dip coating layer is preferably 0.1% to 10%. Si inhibits the growth of the interfacial alloy layer formed in the interface with the base steel sheet, and is added to the molten bath for improving anti-corrosion property and workability. Therefore, Si is contained in the hot-dip coating layer. Specifically, in the case of a hot-dip Al—Zn alloy coated steel sheet, if hot-dip coating treatment is performed with the molten bath containing Si, an alloying reaction takes place between Fe in the steel sheet surface and Al or Si in the bath as soon as the steel sheet is immersed in the molten bath, whereby an Fe—Al compound and/or an Fe—Al—Si compound is formed. By forming the Fe—Al—Si interfacial alloy layer, growth of the interfacial alloy layer is inhibited. By setting the Si content of the molten bath to 0.1% or more, the growth of the interfacial alloy layer can be sufficiently inhibited. On the other hand, if the Si content of the molten bath is 10% or less, an Si phase, which provides paths for cracks to propagate and decreases workability, less likely precipitates in the produced hot-dip coating layer. Therefore, the preferable range of the Si content of the molten bath is 0.1% to 10%. With an Al—Zn alloy coated steel sheet, the composition of the hot-dip coating layer and the composition of the molten bath is substantially the same. Therefore, the range of the Si content of the hot-dip coating layer is preferably the same as the preferable range of Si content of the molten bath i.e. a range of 0.1% to 10%.

Further, the hot-dip coating layer preferably contains at least one element selected from a group consisting of Mn, V, Cr, Mo, Ti, Ni, Co, Sb, Zr, and B in a total of 0.01% to 10%. This is because these elements can improve stability of corrosion products and exhibit an effect of delaying development of corrosion.

The chemical composition of the hot-dip coating layer can be verified by for example, dissolving the hot-dip coating layer by immersing it in an aqueous solution such as hydrochloric acid, and performing ICP emission spectral analysis or atomic absorption analysis on the solution. This method is only intended to be an example and not a limitation. Any other method that enables precisely quantifying the chemical composition of the hot-dip coating layer can be applied.

Further, for the hot-dip Al—Zn alloy coated steel sheet disclosed herein, the mean Vickers hardness of the hot-dip coating layer is preferably 50 Hv to 100 Hv. By setting the Vickers hardness to the above range, excellent anti-corrosion property after working can be achieved.

Specifically, by applying a soft material with a mean Vickers hardness of 100 Hv or less as the hot-dip coating layer, the hot-dip coating layer closely follows the base steel sheet during working such as bending to inhibit crack generation. As a result, anti-corrosion property equivalent to that in flat parts can be obtained in the parts subjected to bending. By setting the lower limit of the Vickers hardness to 50 Hv, it is possible to prevent the hot-dip coating layer from adhering to a die or the like at the time of forming.

Here, the mean Vickers hardness of the hot-dip coating layer is obtained by for example, polishing the cross section of the hot-dip coating layer of the hot-dip Al—Zn alloy coated steel sheet, then measuring said hardness from the cross section direction in several arbitrary areas on the upper layer side of the hot-dip coating layer with low load using a micro Vickers hardness gauge, and calculating the mean value.

While the upper and lower limits of the number of measuring points are not particularly specified, the more the number is, the more preferable it is. From the viewpoint of accuracy of measurement, 10 or more measuring points would be preferable. This method is only intended to be an example and not a limitation. Any other method that enables precisely quantifying the mean Vickers hardness of the hot-dip coating layer can be applied.

Further, while the upper and lower limits of the low load are not particularly specified, a load larger than an appropriate load would cause a large indentation and the measurement results would be influenced by the hardness of the base steel sheet. Therefore, from the viewpoint of avoiding the influence of the base steel sheet, the load is preferably 50 gf or less, and more preferably 10 gf or less.

Further, the coating weight of the hot-dip coating layer of the hot-dip Al—Zn alloy coated steel sheet disclosed herein is preferably 35 $g/m^2$ to 150 $g/m^2$ per side. If the coating weight is 35 $g/m^2$ or more, excellent anti-corrosion property is obtained, and if the coating amount is 150 $g/m^2$ or less, excellent workability is obtained. Further, from the viewpoint of obtaining an even better anti-corrosion property and workability, the coating weight is preferably 40 $g/m^2$ to 110 $g/m^2$, and more preferably 40 $g/m^2$ to 80 $g/m^2$.

Next, the method for producing the hot-dip Al—Zn alloy coated steel sheet of the disclosure will be described.

The hot-dip Al—Zn alloy coated steel sheet of the disclosure is produced in a continuous galvanizing line, and conventional methods may be used except for the management of the composition of the molten bath.

The Al content of the molten bath is set to 25 mass % to 90 mass %, and in addition, at least one element selected from a group consisting of Sn: 0.01% to 2.0%, In: 0.01% to 10%, and Bi: 0.01% to 2.0% is contained. By applying a molten bath of such composition, a hot-dip Al—Zn alloy coated steel sheet with the above hot-dip coating layer structure can be produced. As previously mentioned, Zn is preferably contained in the molten bath in an amount of 10% or more in order to sufficiently provide the hot-dip coating layer with sacrificial corrosion protection ability against Fe, and Si is preferably contained in the molten bath in an amount of 0.1% to 10% in order to inhibit growth of the interfacial alloy layer.

As long as the advantages obtained by the disclosure are not lost, an element other than Al, Zn, Si, Sn, In, Bi mentioned above, for example, Mn, V, Cr, Mo, Ti, Ni, Co, Sb, Zr, and B can be added to the molten bath. In particular, it is preferable for the molten bath to contain at least one of Mn, V, Cr, Mo, Ti, Ni, Co, Sb, Zr, and B in a total of 0.01 to 10% since, as mentioned above, the anti-corrosion property of the produced hot-dip Al—Zn alloy coated steel sheet can be improved.

Further, after hot-dip coating the steel sheet in a continuous galvanizing line, it is preferable to hold the cooled steel sheet at a temperature of 250° C. to 375° C. for 5 seconds to 60 seconds, in order to obtain a hot-dip Al—Zn alloy coated steel sheet with excellent workability. By doing so, Al—Zn alloy coated steel sheets can be produced more efficiently compared to when producing them by combining a hot-dip galvanizing apparatus with a batch type heating apparatus.

The reason for holding the steel sheet at a temperature of 250° C. to 375° C. for 5 seconds to 60 seconds (temperature holding process) is that, with this process, the hot-dip coating layer would not solidify in a non-equilibrium manner by rapid cooling, and strains introduced into the hot-dip coating layer are released, and a phase separation of the Al rich phase and the Zn rich phase in the Al—Zn alloy coating is facilitated and enables softening of the hot-dip coating layer. As a result, workability of the steel sheet can be improved. Further, compared to the conventional hard hot-dip coating layer, with the softened hot-dip coating layer, the number and width of the cracks generated during production decrease and therefore the anti-corrosion property in worked parts can be improved.

If the holding temperature is 250° C. or higher, and the holding time is 5 seconds or longer, the hardening of the hot-dip coating layer does not become too rapid, and will sufficiently release strains and cause separation of the Al rich phase and the Zn rich phase, and therefore a desirable workability can be obtained. On the other hand, a holding temperature of 375° C. or lower would be preferable because in such case, cooling prior to the temperature holding process would be sufficient, and the hot-dip coating will not adhere to the rolls when the coated steel strip carried out from the hot-dip coating bath of the continuous galvanizing line comes into contact with rolls, and metal pickup would not occur i.e. part of the hot-dip coating layer would not come off. Further, if the holding time is 60 seconds or less, the holding time would not be too long, and would be suitable for production in a continuous galvanizing line.

Further, to achieve a better workability, the temperature at which the hot-dip coated steel sheet is held during the temperature holding process is preferably 300° C. to 375° C., and more preferably 350° C. to 375° C. Further, considering manufacturability in the continuous galvanizing line (costs required for the temperature holding process), the time of holding the hot-dip coated steel sheet is preferably 5 seconds to 30 seconds, and more preferably 5 seconds to 20 seconds.

Further, before the above mentioned temperature holding process, the hot-dip coated steel sheet is preferably cooled to a temperature of 375° C. or lower. By cooling the steel sheet to 375° C. or lower, metal pickup will not occur.

As described above, by combining management of the composition of the molten bath and the temperature holding process after hot-dip coating, it is possible to sufficiently produce a hot-dip Al—Zn alloy coated steel sheet having excellent anti-corrosion property after coating as well as good workability and thereby has excellent anti-corrosion property in worked parts, in a continuous galvanizing line.

EXAMPLES

Next, the disclosure will be described further in detail based on examples.

Example 1

Samples 1 to 31

The production of every sample hot-dip Al—Zn alloy coated steel sheet was performed using a cold rolled steel sheet with sheet thickness of 0.8 mm produced by a conventional method as the base steel sheet, and in a continuous galvanizing line, with a molten bath temperature of 600° C., coating weight of 50 g/m$^2$ per side and 100 g/m$^2$ for both sides.

A temperature holding treatment shown in example 2 described later was performed for hot-dip Al—Zn alloy coated steel sheet samples 21 to 28.

(1) Composition of Hot-Dip Coating Layer

Sample hot-dip Al—Zn alloy coated steel sheets were each punched out by 100 mmΦ and immersed in a hydrochloric acid solution of 35% to dissolve the hot-dip coating layer. Then, the composition of the dissolving solution was verified by performing quantification based on ICP emission spectral analysis. The compositions of each sample are shown in Table 1.

(2) Evaluation of Anti-Corrosion Property after Coating

Sample hot-dip Al—Zn alloy coated steel sheets were each sheared into sizes of 90 mm×70 mm, and then similarly to automobile outer panel coating treatment, zinc phosphate treatment was performed as chemical conversion treatment, and then electrodeposition coating, intercoating, and topcoating were performed. Here, zinc phosphate treatment, electrodeposition coating, intercoating, and topcoating were performed under the conditions described below.

Zinc Phosphate Treatment

Using a degreasing agent: FC-E2001, a surface adjusting agent: PL-X, and a chemical conversion treatment agent: PB-AX35M (temperature: 35° C.) manufactured by Nihon Parkerizing Co., Ltd., chemical conversion treatment was performed with the free fluorine concentration of the chemical conversion treatment liquid being 200 mass ppm, and immersion time of the chemical conversion treatment liquid being 120 seconds.

Electrodeposition Coating

Using an electrodeposition coating material: GT-100 manufactured by Kansai Paint Co., Ltd., electrodeposition coating was performed to obtain a coating thickness of 15 µm.

Intercoating

Using an intercoating material: TP-65-P manufactured by Kansai Paint Co., Ltd., spray coating was performed to obtain a coating thickness of 30 µm.

Topcoating

Using a topcoating material: Neo6000 manufactured by Kansai Paint Co., Ltd., spray coating was performed to obtain a coating thickness of 30 µm.

Figure 1:
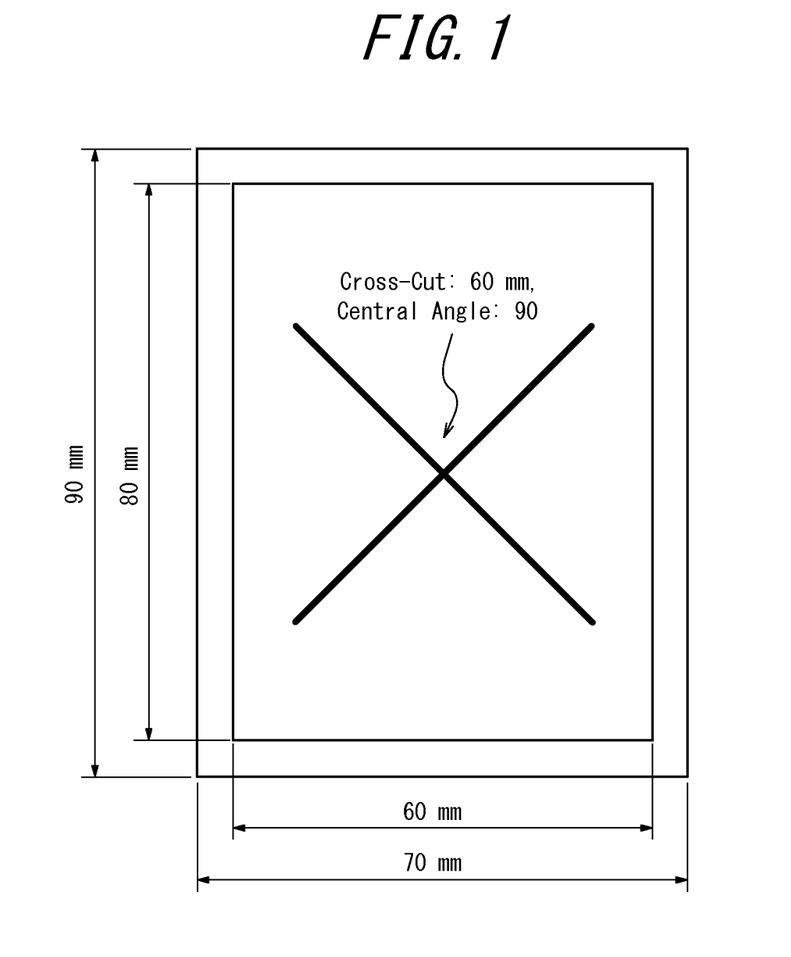
FIG. 1 shows a sample for evaluating anti-corrosion property after coating.

Then, as shown in FIG. 1, samples for evaluation of anti-corrosion property after coating were prepared by sealing using a tape, 5 mm of the end of the surface to be evaluated and the surface not to be evaluated (back surface), and then creating a cross-cut in the center of the surface to be evaluated with a depth reaching the base steel of the hot-dip coated steel sheet, length of 60 mm, central angle of 90°, using a utility knife.

Figure 2:
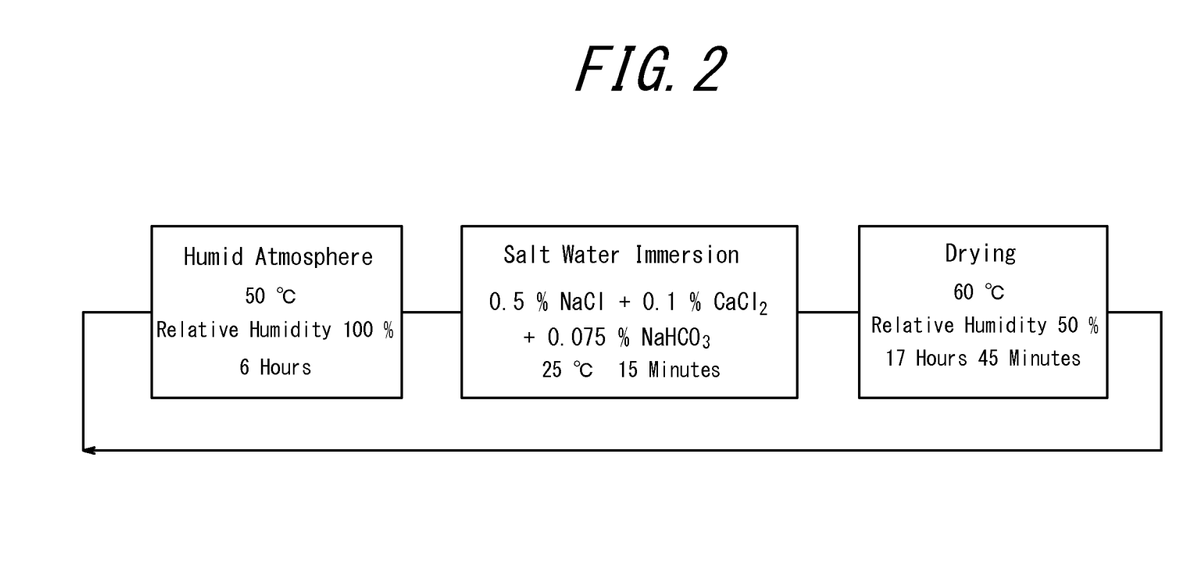
FIG. 2 shows the cycle of the corrosion acceleration test.

Using the above evaluation samples, a corrosion acceleration test was performed in a cycle shown in FIG. 2. Starting from humid atmosphere, the corrosion acceleration test was conducted by performing 60 cycles. Then, the coating blister width of the part where the coating film blister from the damaged part is the largest (maximum coating film blister width: maximum coating film blister width of one side with the damaged part is in the center) was measured, and anti-corrosion property after coating was evaluated based on the following criteria. The evaluation results are shown in Table 1.

Good: Maximum Coating Film Blister Width ≤1.5 mm
Poor: Maximum Coating Film Blister Width >1.5 mm (3) Appearance Quality of Hot-Dip Coating Sample hot-dip Al—Zn alloy coated steel sheets were put into a thermohygrostat bath adjusted to air atmosphere, a temperature of 20° C. and a relative humidity of 50%, within 1 hour from hot-dip coating treatment. Then, after leaving the samples in the bath for 90 days, they were taken out for visual observation of the coated surface, and appearance quality was evaluated based on the following criteria. The evaluation results are shown in Table 1.

Good: No blackening occurred
Fair: Blackening occurred but would not cause any problem in applications where the sheets are used without coating
Poor: Blackening occurred and would cause a problem in applications where the sheets are used without coating

TABLE 1

| No. | Al | Zn | Composition of Hot-Dip Coating Layer/mass % | | | | Anti-Corrosion Property after Coating | Appearance Quality of Hot-Dip Coating | Remarks |
|---|---|---|---|---|---|---|---|---|---|
| | | | Si | Sn | In | Bi | | | |
| 1 | 55 | Balance | 1.6 | — | — | — | Poor | Good | Comparative Example |
| 2 | 55 | Balance | 1.6 | 0.004 | — | — | Poor | Good | Comparative Example |
| 3 | 55 | Balance | 1.6 | 0.010 | — | — | Good | Good | Example |
| 4 | 55 | Balance | 1.6 | 0.10 | — | — | Good | Good | Example |
| 5 | 55 | Balance | 1.6 | 0.12 | — | — | Good | Fair | Example |
| 6 | 55 | Balance | 1.6 | 2.0 | — | — | Good | Poor | Example |
| 7 | 55 | Balance | 1.6 | 2.5 | — | — | Poor | Poor | Comparative Example |
| 8 | 55 | Balance | 1.6 | — | 0.003 | — | Poor | Good | Comparative Example |
| 9 | 55 | Balance | 1.6 | — | 0.011 | — | Good | Good | Example |
| 10 | 55 | Balance | 1.6 | — | 0.10 | — | Good | Good | Example |
| 11 | 55 | Balance | 1.6 | — | 0.14 | — | Good | Fair | Example |
| 12 | 55 | Balance | 1.6 | — | 6.0 | — | Good | Poor | Example |
| 13 | 55 | Balance | 1.6 | — | 10.0 | — | Good | Poor | Example |
| 14 | 55 | Balance | 1.6 | — | 10.5 | — | Poor | Poor | Comparative Example |
| 15 | 55 | Balance | 1.6 | — | — | 0.004 | Poor | Good | Comparative Example |
| 16 | 55 | Balance | 1.6 | — | — | 0.010 | Good | Good | Example |
| 17 | 55 | Balance | 1.6 | — | — | 0.10 | Good | Good | Example |
| 18 | 55 | Balance | 1.6 | — | — | 0.13 | Good | Fair | Example |
| 19 | 55 | Balance | 1.6 | — | — | 2.0 | Good | Poor | Example |
| 20 | 55 | Balance | 1.6 | — | — | 2.2 | Poor | Poor | Comparative Example |
| 21 | 55 | Balance | 1.6 | 0.010 | — | — | Good | Good | Example |
| 22 | 55 | Balance | 1.6 | 0.010 | — | — | Good | Good | Example |
| 23 | 55 | Balance | 1.6 | 0.010 | — | — | Good | Good | Example |
| 24 | 55 | Balance | 1.6 | — | 0.14 | — | Good | Fair | Example |
| 25 | 55 | Balance | 1.6 | — | 0.14 | — | Good | Fair | Example |
| 26 | 55 | Balance | 1.6 | — | 0.14 | — | Good | Fair | Example |
| 27 | 55 | Balance | 1.6 | — | — | 2.0 | Good | Poor | Example |
| 28 | 55 | Balance | 1.6 | — | — | 2.0 | Good | Poor | Example |
| 29 | 55 | Balance | 1.6 | 0.015 | 0.009 | — | Good | Good | Example |
| 30 | 55 | Balance | 1.6 | 0.10 | — | 0.05 | Good | Good | Example |
| 31 | 55 | Balance | 1.6 | — | 6.0 | 0.05 | Good | Poor | Example |

As shown in Table 1, unlike the samples of the comparative example, for our samples, the maximum coating film blister width was 1.5 mm or less, and therefore hot-dip Al—Zn alloy coated steel sheets with excellent anti-corrosion property after coating were obtained.

Further, it can be seen that, regarding our samples, by limiting the content of Sn, In, and Bi in the hot-dip coating layer to their respective appropriate ranges, hot-dip Al—Zn alloy coated steel sheets that are excellent in both appearance quality and anti-corrosion property after coating can be obtained.

Example 2

Among our samples produced in Example 1, the hot-dip Al—Zn alloy coated steel sheets of samples 21 to 28 were subjected to the above hot-dip coating treatment, cooled to 370° C., and then subjected to a temperature holding treatment under the conditions shown in Table 2.

Then, the following evaluation was performed for samples 3 to 5, 10 to 12, 17, 18, and 21 to 31.

(1) Vickers Hardness of Hot-Dip Coating Layer

For each of the above sample hot-dip Al—Zn alloy coated steel sheets, the cross section of the hot-dip coating layer was polished, and then the Vickers hardness of twenty arbitrary areas on the upper layer side of the hot-dip coating layer was measured from the cross section direction with a load of 5 gf using a micro Vickers hardness gauge. The mean value of the twenty areas measured was calculated and used as the hardness of the hot-dip coating layer. The calculation results are shown in Table 2.

(2) Evaluation of Anti-Corrosion Property in Worked Parts

For each of the above sample hot-dip Al—Zn alloy coated steel sheets, four sheets with the same sheet thickness were placed inside and 180° bending (4T bending) was performed, and then a salt spray test was performed in the outside of the bending in accordance with JIS Z2371-2000. The time required until red rust generated in each sample was measured, and evaluated based on the following criteria. The evaluation results are shown in Table 2.

Good: Red Rust Generation Time ≥4000 hours
Poor: Red Rust Generation Time <4000 hours

TABLE 2

| No. | Holding Temp. after Hot-Dip Coating (° C.) | Time (Sec.) | Vickers Hardness (Hv) | Anti-Corrosion Property after Working |
|---|---|---|---|---|
| 3 | — | — | 131 | Poor |
| 4 | — | — | 132 | Poor |
| 5 | — | — | 134 | Poor |
| 10 | — | — | 129 | Poor |
| 11 | — | — | 131 | Poor |

TABLE 2-continued

| No. | Holding Temp. after Hot-Dip Coating (° C.) | Time (Sec.) | Vickers Hardness (Hv) | Anti-Corrosion Property after Working |
|---|---|---|---|---|
| 12 | — | — | 136 | Poor |
| 17 | — | — | 126 | Poor |
| 18 | — | — | 128 | Poor |
| 21 | 200 | 20 | 130 | Poor |
| 22 | 320 | 20 | 82 | Good |
| 23 | 360 | 10 | 75 | Good |
| 24 | 360 | 3 | 109 | Poor |
| 25 | 360 | 5 | 92 | Good |
| 26 | 360 | 10 | 79 | Good |
| 27 | 300 | 20 | 84 | Good |
| 28 | 360 | 20 | 78 | Good |
| 29 | — | — | 126 | Poor |
| 30 | — | — | 127 | Poor |
| 31 | — | — | 135 | Poor |

Table 2 shows that, compared to samples which were not subjected to temperature holding, samples which were held in a temperature of 250° C. to 375° C. for 5 seconds or more after hot-dip coating are softer with a Vickers hardness is 100 Hv or less and have better anti-corrosion property after working which is a secondary effect of the disclosure.

INDUSTRIAL APPLICABILITY

The hot-dip Al—Zn alloy steel sheets described herein have excellent anti-corrosion property after coating, and can be applied in a wide range of fields including those of automobiles, household electric appliances, and building materials. Particularly, when applied for high strength steel sheets in the field of automobiles, they can be used as surface-treated steel sheets which enable reducing the weight of automobiles and obtaining high anti-corrosion property.

The invention claimed is:

1. A hot-dip Al—Zn alloy coated steel sheet having a hot-dip coating layer,
wherein the hot-dip coating layer consists of, by mass %, Al: 25% to 90%; at least one element selected from a group consisting of Sn, In, and Bi such that Sn, if contained, is contained in an amount of 0.01 to 0.12 mass %, In, if contained, is contained in an amount of 0.01 to 10 mass %, and Bi, if contained, is contained in an amount of 0.01 to 2.0 mass %; optionally Si: 0.1% to 10%; optionally at least one element selected from a group consisting of Mn, V, Cr, Mo, Ti, Ni, Co, Sb, Zr, and B in a total of 0.01% to 10%; and the balance being Zn and incidental impurities.

2. The hot-dip Al—Zn alloy coated steel sheet according to claim 1, wherein the hot-dip coating layer contains by mass %, Zn: 10% or more.

3. The hot-dip Al—Zn alloy coated steel sheet according to claim 1, wherein the hot-dip coating layer contains by mass %, Si: 0.1% to 10%.

4. The hot-dip Al—Zn alloy coated steel sheet according to claim 1, wherein the Al content of the hot-dip coating layer is 45 mass % to 70 mass %.

5. The hot-dip Al—Zn alloy coated steel sheet according to claim 1, wherein the hot-dip coating layer contains at least one element selected from a group consisting of Sn, In, and Bi such that Sn, if contained, is contained in an amount of 0.01 to 0.12 mass %, In, if contained, is contained in an amount of 0.01 to 1.0 mass %, and Bi, if contained, is contained in an amount of 0.01 to 1.0 mass %.

6. The hot-dip Al—Zn alloy coated steel sheet according to claim 1, wherein the mean Vickers hardness of the hot-dip coating layer is 50 Hv to 100 Hv.

7. The hot-dip Al—Zn alloy coated steel sheet according to claim 1, wherein the Bi content of the hot-dip coating layer is 0.13 mass % to 2.0 mass %.

8. A method for producing a hot-dip Al—Zn alloy coated steel sheet in a continuous galvanizing line, the method comprising:
immersing a base steel sheet in a molten bath to apply hot-dip coating thereon in the continuous galvanizing line, the molten bath consisting of, by mass %, Al: 25% to 90%; at least one element selected from a group consisting of Sn, In, and Bi such that Sn, if contained, is contained in an amount of 0.01 to 0.12 mass %, In, if contained, is contained in an amount of 0.01 to 10 mass %, and Bi, if contained, is contained in an amount of 0.01 to 2.0 mass %; optionally Si: 0.1% to 10%; optionally at least one element selected from a group consisting of Mn, V, Cr, Mo, Ti, Ni, Co, Sb, Zr, and B in a total of 0.01% to 10%; and the balance being Zn and incidental impurities.

9. The method for producing a hot-dip Al—Zn alloy coated steel sheet according to claim 8, wherein the molten bath contains by mass %, Zn: 10% or more.

10. The method for producing a hot-dip Al—Zn alloy coated steel sheet according to claim 8, wherein the molten bath contains by mass %, Si: 0.1% to 10%.

11. The method for producing a hot-dip Al—Zn alloy coated steel sheet according to claim 8, wherein the molten bath contains by mass %, at least one element selected from a group consisting of Sn, In, and Bi such that Sn, if contained, is contained in an amount of 0.01 to 0.12 mass %, In, if contained, is contained in an amount of 0.01 to 1.0 mass %, and Bi, if contained, is contained in an amount of 0.01 to 1.0 mass %.

12. The method for producing a hot-dip Al—Zn alloy coated steel sheet according to claim 8, further comprising holding the hot-dip coated steel sheet at a temperature of 250° C. to 375° C. for 5 seconds to 60 seconds in the continuous galvanizing line.

13. The method for producing a hot-dip Al—Zn alloy coated steel sheet according to claim 12, wherein the hot-dip coated steel sheet is held at a temperature of 300° C. to 375° C. for 5 seconds to 60 seconds in the continuous galvanizing line.

14. The method for producing a hot-dip Al—Zn alloy coated steel sheet according to claim 8, wherein the molten bath contains 0.13 mass % to 2.0 mass % of Bi.

* * * * *